(12) United States Patent
Killinger

(10) Patent No.: US 11,543,528 B2
(45) Date of Patent: Jan. 3, 2023

(54) SYSTEM AND METHOD OF DYNAMIC LIGHT SOURCE CONTROL

(71) Applicant: University of South Florida, Tampa, FL (US)

(72) Inventor: Dennis Karl Killinger, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 584 days.

(21) Appl. No.: 16/692,581

(22) Filed: Nov. 22, 2019

(65) Prior Publication Data

US 2020/0174126 A1 Jun. 4, 2020

Related U.S. Application Data

(60) Provisional application No. 62/773,626, filed on Nov. 30, 2018.

(51) Int. Cl.
| | | |
|---|---|---|
| *G01S 17/42* | (2006.01) | |
| *G01S 7/481* | (2006.01) | |
| *G01S 17/89* | (2020.01) | |

(52) U.S. Cl.
CPC .......... *G01S 17/42* (2013.01); *G01S 7/4817* (2013.01); *G01S 17/89* (2013.01)

(58) Field of Classification Search
CPC ... B60Q 1/085; B60Q 2300/42; G01J 1/0466; G01J 1/04; G02B 6/2019; G02B 6/3552; G02F 1/313; H04J 14/0212
See application file for complete search history.

(56) References Cited

U.S. PATENT DOCUMENTS

| | | | |
|---|---|---|---|
| 5,303,084 A | 4/1994 | Pflibsen et al. | |
| 5,996,895 A * | 12/1999 | Heiman | G06K 7/10633 |
| | | | 235/472.01 |

(Continued)

FOREIGN PATENT DOCUMENTS

| | | |
|---|---|---|
| CN | 101408618 A | 7/2010 |
| WO | 2017200896 A2 | 5/2017 |

OTHER PUBLICATIONS

Killenger, D.K., "Lidar (light detection and ranging)," Laser Spectroscopy for Sensing—Fundamentals Techniques and Applications, Chapter 10, ed. Matthieu Baudelet, Woodhead Publishing , 2014.

(Continued)

*Primary Examiner* — Yosef Kassa
(74) *Attorney, Agent, or Firm* — Meunier Carlin & Curfman LLC

(57) ABSTRACT

A system and method of adjusting a field of view in an imaging system includes transmitting light across a transmission optical path and defining a field of view encompassing both uniform and spatially tenuous target objects within the transmitted light. A sensor within a return optical path of reflected light from at least a portion of one of the target objects allows a data processing computer to compile an image from a series of data outputs from the sensor. The image is analyzed to determine a region of interest within the image and by dynamically adjusting the light source, the computer is configured to change the field of view of the light source such that the image includes a higher resolution and/or signal intensity for the region of interest. The region of interest may include at least one spatially tenuous target object.

20 Claims, 8 Drawing Sheets

(56) References Cited

U.S. PATENT DOCUMENTS

| | | | | |
|---|---|---|---|---|
| 6,529,280 B1* | 3/2003 | Yahashi | ............. | G01B 11/2518 356/602 |
| 6,839,366 B1 | 1/2005 | Houle | | |
| 7,459,697 B2* | 12/2008 | Kitaoka | ................ | G01N 21/645 250/458.1 |
| 8,140,219 B2* | 3/2012 | Cernasov | ............... | G02C 7/101 359/601 |
| 8,284,466 B2* | 10/2012 | Sawada | ................ | H04N 1/6086 358/1.9 |
| 8,416,455 B2* | 4/2013 | Sawada | ................ | H04N 1/6088 358/1.9 |
| 8,502,456 B2* | 8/2013 | Jarrell | .................... | H05B 47/11 315/131 |
| 8,565,861 B2* | 10/2013 | Taira | ...................... | G01N 21/65 600/478 |
| 9,789,808 B1* | 10/2017 | Hong | .................... | B60Q 1/085 |
| 10,272,825 B2* | 4/2019 | Frederick | ................. | B60D 1/62 |
| 2011/0216304 A1 | 9/2011 | Hall | | |
| 2012/0038903 A1 | 2/2012 | Weimer et al. | | |

OTHER PUBLICATIONS

Chen, Teng, et al. "Remote Raman spectra of benzene obtained from 217 meters using a single 532 nm laser pulse." Applied spectroscopy 61.6 (2007): 624-629.

Killinger, D.K., and Norman Menyuk. "Laser remote sensing of the atmosphere." Science 235.4784 (1987): 37-45.

Gardner, Chester S., et al. "Simultaneous observations of sporadic E, Na, Fe, and Ca+ layers at Urbana, Illinois: Three case studies." Journal of Geophysical Research: Atmospheres 98.D9 (1993): 16865-16873.

Killinger, Dennis K. "Laser Probes for Chemical Sensing and Remote 3D Mapping." Technology & Innovation 12.2 (2010): 99-113.

Kobayashi, Takao. "Techniques for laser remote sensing of the environment." Remote Sensing Reviews 3.1 (1987) 1-56.

Eloranta, Edwin W., and Daniel K. Forrest. "Volume-imaging lidar observations of the convective structure surrounding the flight path of a flux-measuring aircraft." Journal of Geophysical Research: Atmospheres 97.D17 (1992): 18383-18393.

Huffaker, R. M., A. V. Jelalian, and J. A. L. Thomson. "Laser-Doppler system for detection of aircraft trailing vortices." Proceedings of the IEEE 58.3 (1970): 322-326.

Huffaker, RMilton, and RMichael Hardesty. "Remote sensing of atmospheric wind velocities using solid-state and CO/sub 2/coherent laser systems." Proceedings of the IEEE 84.2 (1996): 181-204.

Browell, Edward V., et al. "NASA multipurpose airborne DIAL system and measurements of ozone and aerosol profiles." Applied Optics 22.4 (1983): 522-534.

* cited by examiner

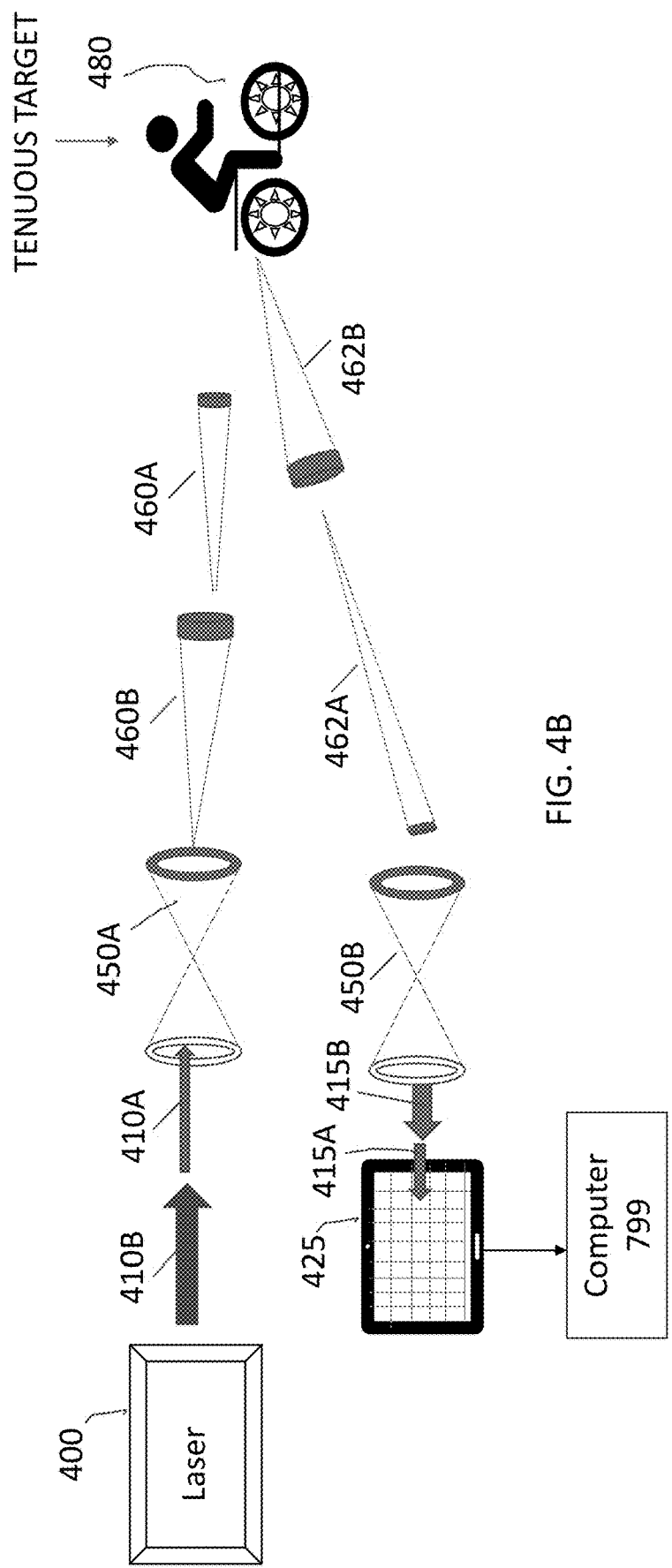

SYSTEM AND METHOD OF DYNAMIC LIGHT SOURCE CONTROL

CROSS REFERENCE TO RELATED APPLICATIONS

This application claims priority to and incorporates entirely by reference U.S. Provisional Patent Application Ser. No. 62/773,626 entitled System and Method of Dynamic Light Source Control and filed on Nov. 30, 2018.

STATEMENT REGARDING FEDERALLY SPONSORED RESEARCH

None.

FIELD

This disclosure relates to imaging systems that use laser light sources to transmit light onto a target region (e.g., Light Detection and Ranging systems, generally referred to as LIDAR or LiDAR or lidar or Ladar). According to this disclosure, the imaging system is configured to identify target objects of diverse, and even non-uniform, shapes, sizes, and consistency by receiving reflected light back to a sensor that continuously updates an image of a field of view.

BACKGROUND

Lidar is an acronym for light detection and ranging, similar to that for radar (radio detection and ranging), and usually uses a spatially narrow laser beam as a probe of the surrounding environment, including 3D mapping of distant hard targets and spectroscopic sensing of gases and constituents from afar. Lidar techniques have been used for several laser remote sensing applications including laser ranging to selected military targets or as illuminators for target designators, tracking of space debris and satellites in orbit, remote sensing of ozone and $CO_2$ and other global gases in the atmosphere, high spatial resolution mapping of buildings including Mayan ruins under a jungle canopy, Doppler wind lidar mapping of winds at airports and wind farms, NASA detection of ice sheet changes in the arctic, remote monitoring of chemical smoke stack emissions, and emission-based lidar such as standoff laser-induced breakdown spectroscopy of remote surfaces. Lidar 100 in its most basic form can be depicted as in FIG. 1, which shows a pulsed laser beam being directed into the atmosphere and subsequently being backscattered by a hard target or clouds (aerosols) in the atmosphere. Killinger D. K. (2010), 'Laser Probes for Chemical Sensing and Remote 3D Mapping, Technology and Innovation,' 12, 99-113. Killinger D K (2002), 'Lidar and Laser Remote Sensing, in Chalmers and Griffiths,' (eds.), *Handbook of Vibrational Spectroscopy*, John Wiley and Sons, Chichester.

The backscattered light can be collected by a telescope and focused onto an optical detector. In some cases, the wavelength or spectral properties of the backscattered light can be analyzed to obtain further information of the distant laser spectroscopic interaction with the target, keeping in mind that the distant target can be a hard target (building) or cloud (aerosols) or even ambient air (molecular species). In each of these cases, the special attributes of the laser can be used to obtain spectroscopic and reflective or spatial information concerning the distant target area. In particular, the basic properties that make a laser so useful as an optical or spectroscopic probe of the atmosphere or of distant targets are its spatial, temporal, and spectral characteristics. Each of these unique characteristics can be examined as follows.

Most lasers produce a high power beam of light with good spatial coherence properties, so that the laser beam is a narrow beam that is diffraction limited with an angular radian expansion of about $\lambda/d$ where $\lambda$ is the wavelength and d is the size of the propagated laser beam (usually expanded by use of a telescope). As such, the laser beam propagates as a beam through the atmosphere so that the size of a 10 cm wide collimated laser beam only increases about a 0.01 m or so for each 1000 m of propagation range. The laser beam is often smaller than the hard target or cloud that is being used as a target and as such all of the light is deposited (and reflected) from the target; this is in contrast to a microwave beam (i.e. radar) that uses a noncoherent source and has a wide transmitted beam that spreads on the order of 1°-2°. As a consequence, the laser beam can scan and map out the targeted area.

The temporal properties of a pulsed laser are such that short laser pulses, on the order of nanoseconds to microseconds, are easily obtained. Since light travels at a speed of 1 m in 3 ns, it is easy to measure the time of flight of the laser pulse to determine the range to the reflecting target. Accuracy on the order of 0.1 m or less is often obtainable, leading to accurate distance measurements to hard targets and range-resolved measurements inside a distributed target (i.e. cloud) on the order of meters. Finally, one of the most important properties of a laser with applications for lidar and laser remote sensing is the wavelength tuning and wavelength purity, or spectral linewidth, of the laser. Many lasers are tunable to some degree and often have a linewidth that is smaller than, or comparable to, that of the spectral lines or bands of the gases being measured. Under proper conditions lasers offer linewidths on the order of a $0.1 \text{ cm}^{-1}$ or less (about 0.01 nm at 1 μm wavelength), which is about equal to the spectral absorption linewidth of many light weight gases in the atmosphere at atmospheric pressure. As such, lasers can often be used under selected conditions as ideal spectroscopic probes of many gases and compounds. In addition, if the backscattered lidar return involves spectroscopic interactions (such as fluorescence, differential absorption, Raman scatter, Doppler velocity shifts, etc.), then these interactions often produce wavelength or frequency shifted returns that can be spectrally separated using a spectrometer or Fabry-Pérot etalon from the narrow linewidth laser wavelength signal.

It should be noted that one of the main challenges for greater application of lidar and spectroscopic probes is that many common lasers do not provide the wavelength coverage desired at power or energy levels that are useful (Killinger, 2002). For example, $CO_2$ and Nd:YAG lasers provide high output power, but are limited to discrete emission wavelengths near 10.6 μm and 1.064 μm, respectively.

Current optical parametric oscillator (OPO) lasers cover a much wider wavelength range, but with lower output power and limited scanning coverage within a short time period, without changing some laser cavity elements. In addition, there are several continuous wave (CW) lasers that emit in the important 3-5 μm wavelength range, but often have to be cooled or changed in semiconductor composition to achieve wide wavelength tuning. As a result, the development of widely tunable lasers with moderate operating conditions and reasonable output power levels, especially in the eye-safe wavelength range (>1.4 microns), has been one of the basic research drivers in the growth of lidar. The sensitivity and detection range of a lidar system can be estimated to first order by use of the lidar equation. The returned lidar signal can be depicted as in FIG. 2, where the output laser beam power, Pt, is transmitted through the atmosphere to a target at a range R, back-reflected into a hemisphere of $2\pi$ steradians with a target reflectivity $\rho$, and collected by a telescope with area A. Killinger D K and Menyuk N (1987), 'Laser remote sensing of the atmosphere', Science, 235, 37-45. The returned lidar signal, Pr, can then be given by the lidar equation as $$Pr = Pt\rho(A/\pi R^2)e^{-2\alpha R}$$

The Beer-Lambert attenuation, $e^{-2\alpha R}$ is shown for a two-way path and includes the total attenuation coefficient $\alpha$ of the atmosphere. Also, for simplicity, the implied integral along the transmitted and back-reflected path is suppressed in the equation above but can be added for distributed spatial features of target volume and attenuation.

The effective target reflectivity will depend upon the target type and the backscatter or optical spectroscopic interaction of the laser with the target such as fluorescence emission, Raman emission, differential absorption surface scatter, specular mirror reflection, Mie or Rayleigh scattering, etc. For a lidar or DIAL system that uses a hard target to back-reflect the laser beam, the target reflectivity is just that of ordinary surfaces, on the order of 5-50%. However, for the case where the lidar system can detect the weak backscatter from atmospheric aerosols or molecular emissions, the effective target reflectivity is modified to include a range resolution term, $\tau c/2$, where $\tau$ is the pulse length of the lidar laser pulse and c is the speed of light. This range resolution represents the time (or distance in range) that the detection system of the lidar will integrate all of the backscattered photons into one value. The effective target reflectivity is then $\rho = \beta\tau c/2$, where $\beta$ is the backscatter coefficient. It is informative to list typical values for the effective target reflectivity for these different optical processes for the case of a range resolution, $\tau c/2$, of 100 m and 1 atm concentration. Typical values for the effective target reflectivity for these different optical processes are about 0.01 UV fluorescence, $10^{-9}$ for Raman backscatter, about $10^{-4}$ for aerosols, and about $10^4$ using a retroreflector array (corner cube mirror). As can be seen, there is a wide range of effective backscatter values, depending upon the optical process and spectroscopic analysis that is used. It is important to realize that while many of the different processes can occur at the same time, it is usual to design the lidar system so that only one of the above reflectivities or optical spectroscopic interactions is dominant.

The returned lidar signal must be compared to the noise of the lidar system to obtain the system signal-to-noise ratio (SNR) ((Kabayashi T (1987), 'Techniques for laser remote sensing of the environment', Remote Sens. Rev., 3, 1-56.; Killinger D K (2002), 'Lidar and laser remote sensing', in Chalmers and Griffiths, (eds.), Handbook of Vibrational Spectroscopy, John Wiley and Sons, Chichester.)). Under most conditions, shot noise is the dominant noise in the UV and visible spectral regions when photomultiplier tubes (PMT) are used. On the other hand, in the near to mid-IR (1-10 $\mu$m), background limited performance (BLIP), due to the thermal radiation of the 300 K background striking the detector, is the dominant noise source. In the latter case, the noise equivalent power (NEP) of the detector is related to the intrinsic detectivity of the detector material as:

$$NEP = ((A_D B)^{1/2})/D^*$$

where $A_D$ is the area of the detector in $cm^2$, B is the electrical bandwidth of the detector electronics in Hz, and $D^*$ is the detectivity of the material in units of (cm $Hz^{1/2}$/W). As an example, the NEP of a photodetector in the 2-5 $\mu$m wavelength range may vary from about $10^{-7}$ W to as low as about $10^{-10}$ W for detectors with sizes on the order of 0.1-5 mm and electrical bandwidths from 1 MHz to 10 MHz. The NEP of the detector is usually lowered by cooling the detector and placing a cold (narrow-optical bandwidth optical) filter in front of the detector and inside the liquid nitrogen dewar.

The backscattered signal can be considered useful for analytical purposes if the returned lidar signal, Pr, is at least greater than the NEP. The ratio between these two values is the SNR (=Pr/NEP), which needs to be greater than 1. Using the above lidar equation for a typical lidar system (say 1 mJ/pulse and 5 ns pulse length, 0.1 $m^2$ telescope area, hard target, and NEP of $10^{-8}$ W), the range for which the SNR is greater or equal to 1 is on the order of several kilometers. This example shows that even low to moderate power lidar systems can have detection ranges of several kilometers or more.

In most lidar applications, the delay for the backscattered laser pulse to return to the telescope detector is measured to determine the time of flight or range to the target, but it also serves to allow for the time gating of the lidar signal, so that only the lidar signal at a particular time delay is processed; this usually involves using a 'boxcar integrator' or transient digitizer for the signal, but the overall result is to reduce the integrated noise surrounding the timed lidar return pulse and improve the SNR. In addition, the spectroscopic properties of the returned light can be measured to obtain additional information such as fluorescence signatures and Raman and Doppler shifted returns. In these cases, the lidar equation can be modified to show this time delay and optical wavelength dependence as:

$$P_r(t+2cR+t_e;\lambda_e) = Pt(t;\lambda_t)\rho(t_e;\lambda_e;\lambda_t)$$
$$(A/\pi R^2)e^{-2\alpha(t;\lambda_e;\lambda_t)R}$$

where t is the time when the lidar pulse was transmitted, c is the speed of light, and the propagation lidar delay time for the received optical lidar signal is shown by the two-way time of flight, 2cR, and a possible emission delay (i.e. fluorescence lifetime), $t_e$. The possible interactions of the emission wavelengths, $\lambda_e$, and transmitted wavelength, $\lambda_t$, on the effective reflectivity and atmospheric attenuation are also shown. Under normal circumstances, the design of the lidar system is made to emphasize only one of the possible optical interactions implied in the equation above; an example would be when a Doppler lidar only measures the Doppler shift of the returned lidar signal compared to the transmitted lidar signal, and is not designed to measure any potential fluorescence emission from the target, or vice versa.

Lidar systems can be differentiated by the optical interactions into several different types. These are commonly indicated by the terms or names that follow.

Classical Lidar

Single wavelength lidar, which measures backscatter from hard targets and clouds. The received wavelength is the same as the transmitted wavelength. The lidar can be used with a scanning laser beam to better map spatial targets (Eloranta E W and Forrest D K (1992), 'Volume-imaging lidar observations of the convective structure surrounding the flight path of a flux-measuring aircraft', J. Geophys. Res., 97 (D17), 18,383-18,393.).

Doppler Lidar

Measures the small Doppler shift of a moving target (hard target or atmospheric winds) to determine the velocity of the target from the Doppler shift. Typical Doppler shifts are about 10 MHz for a target velocity of 10 m/s at a wavelength of about 1 micron (Huffaker R M, Jelalian A V and Thomson J A L (1970), 'Laser Doppler system for detection of aircraft trailing vortices', Proc. of IEEE, 58, 322-326; Huffaker R M and Hardesty R M (1996), 'Remote sensing of atmospheric wind velocities using solid-state and CO 2 coherent laser systems', Proc. of the IEEE, 84, 181-204.).

Differential Absorption Lidar (DIAL)

Uses two or more different wavelengths where the wavelengths are chosen so that one wavelength is absorbed by a trace gas or chemical in the atmosphere while the other is used for background correction; the concentration is then determined by the difference in the absorption of the lidar returns (see, Browell E V, Carter A F, Shipley S T, Allen R J, Butler C F, Mayo M N, Siviter J H and Hall W M (1983), 'NASA multipurpose airborne DIAL system and measurements of ozone and aerosol profiles', Appl. Opt., 22, 522-534).

Fluorescence Lidar

The lidar beam is used to excite a distant chemical, atomic, or biological species, and the emitted fluorescence light is detected. Typical fluorescence lifetimes for the emission of the fluorescence light are on the order of 10 ns for atomic species, and up to 1 ms for proteins and phosphorescent transition metals (Gardner C S, Kane T J, Senft D C, Chan J, and Papen G C, (1993), 'Simultaneous observations of sporadic E, Na, Fe, and Ca+ layers at Urbana and Ft. Collins', *J. Geophys. Res.,* 3. 98 (D9), 16865-16873).

Raman Lidar

The lidar beam is used to produce Raman emission from the distant target area, and is spectroscopically detected within the back-reflected return (see, Chen T, Madey J M J, Price F M, Sharma S K and Lienert B (2007), 'Remote Raman spectra of benzene obtained from 217 meters using a single 532 nm laser pulse', Appl. Spectrosc., 61, 624-629.).

Emission-Based Lidar

The lidar laser beam is used to produce optical or thermal emission at a distant target area. For example, an optical process can involve laser-induced breakdown spectroscopy (LIBS), which emits atomic emission from a heated plasma spark produced by the focused lidar laser beam onto a target surface (see, Miziolek A, Palleschi V and Schechter I (eds.) (2006), Laser Induced Breakdown Spectroscopy, Cambridge University Press, Cambridge, UK). Fluorescence and Raman lidar are also examples of an emission-based lidar, but generally are given a separate category, due to their historical importance.

Imaging technology continues to rely upon advancements in various kinds of light scanning equipment, such as sensor arrays that rapidly update display pixels in accordance with reflected light received at the sensor. The laser scanner is a major component contributing to the growth of this market. The market for laser scanners is increasing at good pace owing to the technological advancement in laser technology. Moreover, the market for laser scanners is also growing due to a rising demand for ground-based LiDAR.

The market for solid-state LiDAR is expected to exhibit the highest growth rate during the forecast period. Solid-state LiDAR systems use laser scanners to generate a 3D image of the environment, and this 3D image is processed automatically to perform monitoring, warning, braking, and steering tasks. The growth in the market for solid-state LiDAR can be attributed to the advancement in the automotive industry, especially aimed at the driverless cars and advanced driver assistance systems (ADAS) application. Solid-state LiDAR can be used in various automotive applications such as in ADAS, autonomous cars, and so on. The inclination toward self-driven cars and few mandates for ADAS application is promoting the growth of the market.

The market for Geographical Information Services (GIS) services is also witnessing a substantial growth opportunity owing to increasing demand for GIS services in canopy height estimation, forest planning, and harvesting planning applications. These applications are adopted by the government for the forest management and for planning crops. Increasing interest of the governments is expected to encourage the overall LiDAR market. North America dominates the LiDAR market owing to the increasing investment of business giants toward ADAS and driverless cars, providing new opportunities for small, versatile, and low-cost LiDAR systems.

Autonomous LiDAR systems are being used for 3D mapping of targets related to driverless vehicles. However, such systems use a fixed, laser-transmitted beam shape that is sufficient when the target area is of the same size or larger than the laser beam. When a tenuous and spatially distributed target is illuminated, then a significant portion of the laser beam is not reflected back toward the LiDAR receiver.

Recent vehicle LiDAR systems have had trouble sensing tenuous and spatially distributed targets such as a bicycle or a person on a bicycle. This disclosure explains embodiments of LiDAR technology that would provide for increasing the LiDAR backscattered signal from the bicycle target by dynamically changing the transmitted size of the LiDAR beam so as to better overlap the spatial components of the target (e.g., bicycle components separated by open areas).

This disclosure solves the problem of tailoring an imaging light source to a specified target by dynamically and in real time changing the size of the transmitted laser beam so that a fraction of laser light intercepted and backscattered by the target is increased with dynamic focusing operations or multi beam shaping techniques.

SUMMARY

This disclosure shows a dynamic, real time changing of the size of a transmitted laser beam used in an imaging system so that the fraction of laser light intercepted and backscattered by the target is increased using dynamic focusing or laser spatial TEM mode or interlaced sequenced two or more lasers with different transmitted beam sizes or multi-beam shaping techniques.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

FIG. 4B is a schematic representation of an example implementation of this disclosure to focus the light source on a spatially tenuous object within a region of interest.

DETAILED DESCRIPTION

Embodiments of this disclosure present imaging systems with automated software run by controlling computers that allow for the imaging components within the system to be adjusted in real time. The computers disclosed herein provide for dynamic adjustments to light sources, such as lasers, and/or other optical equipment connected within the system. The adjustments may occur "on the fly" after being triggered by image data processing results from lidar and/or other sensor systems. The adjustments may also be coordinated with pre-programmed algorithms implementing iterative changes, i.e., dithering of components, in the system on a continuous basis. The adjustments may be on a pulse to pulse basis or grouped sequentially for a rapidly pulsed lidar system (say operating at a pulse repetition frequency of 1 KHz to 1 MHz) or for selected temporal time period for a CW (continuous wave) lidar system as directed by the target lidar returns.

Figure 1:
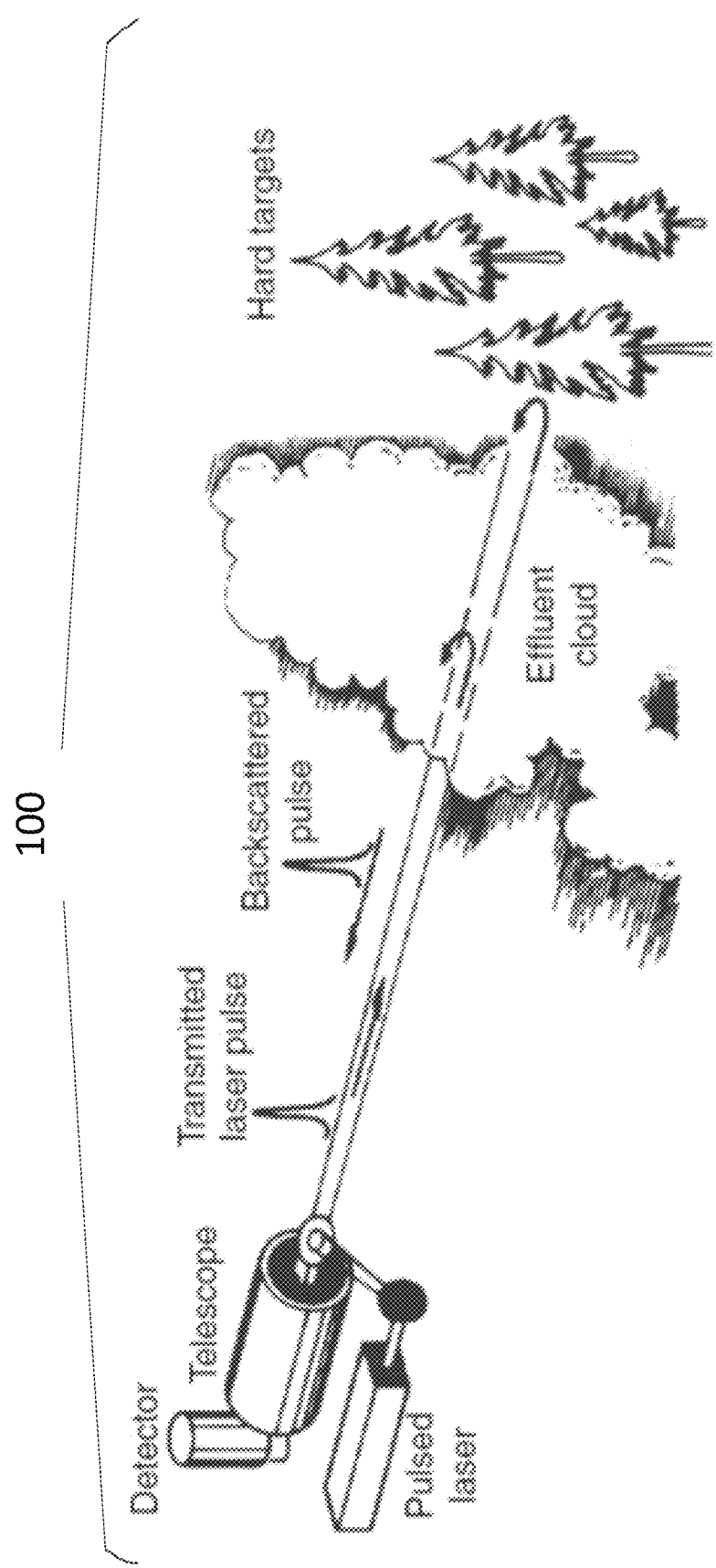
FIG. 1 is a PRIOR ART schematic representation of a traditional LiDAR imaging system showing transmission of laser pulse into the environment and telescope detection of back-reflected pulse from hard targets or clouds.
Figure 2:
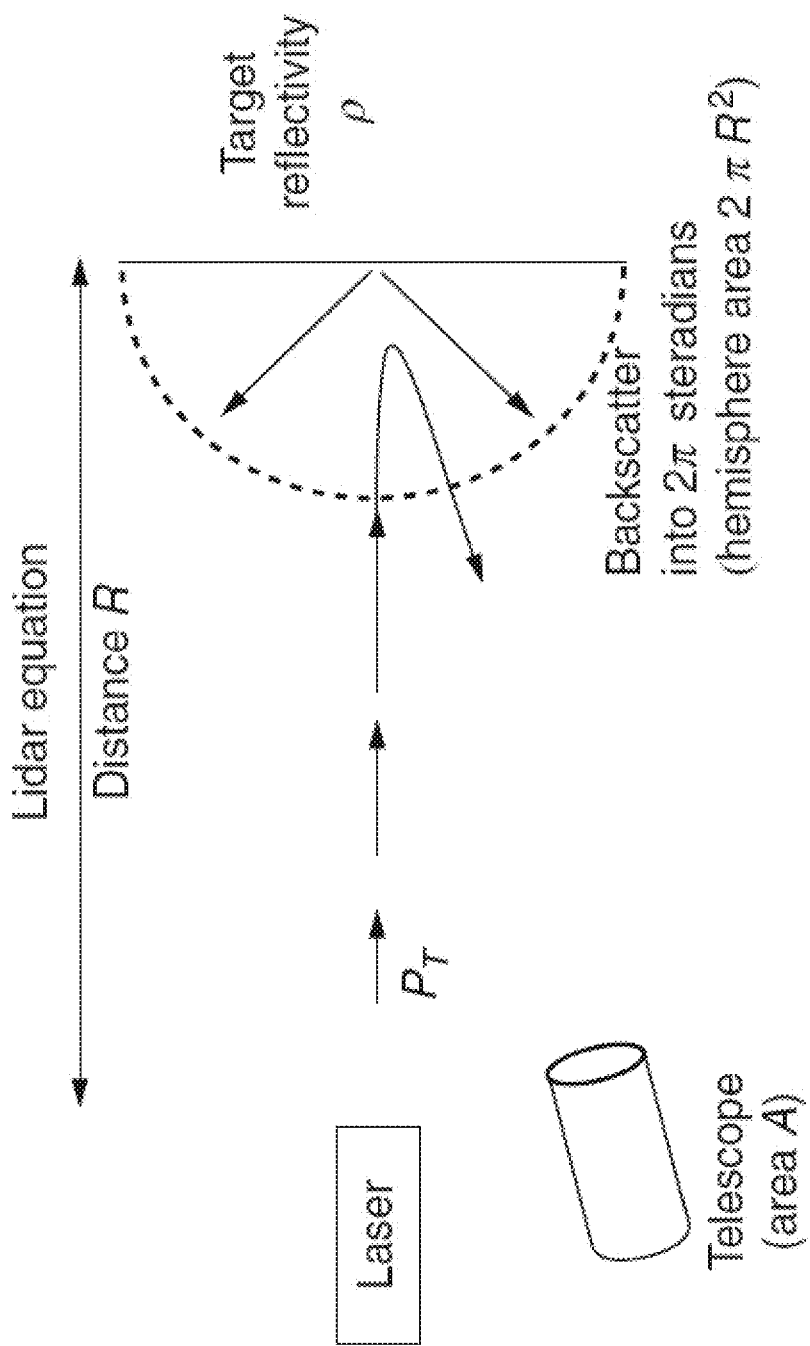
FIG. 2 is a PRIOR ART schematic representation of lidar equation geometry showing backscatter of the lidar laser pulse and collection by a telescope.
Figure 3:
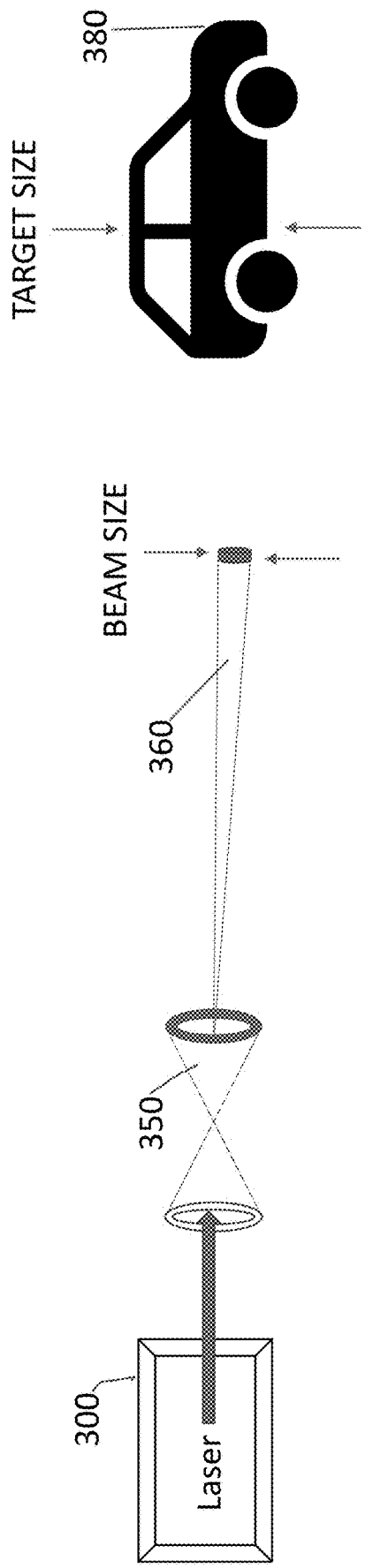
FIG. 3 is a schematic representation of an imaging system having a dynamically adjusted light source and field of view as disclosed herein.

FIG. 3 illustrates a version of imaging systems imaging systems using lasers 300 for light sources, such as, but not limited to, Light Detection and Ranging systems (i.e., "LiDAR" systems), are modeled according to a LiDAR equation:

$$P_R = P_T((\rho e^{-2\alpha R}/\pi R^2) \cdot A^{Telescope}), \text{ where:}$$

$P_R$ is the power signal in Watts of light received at a receiving sensor (i.e., a telescope in traditional nomenclature); generally, the LiDAR power incident on the receiver from range R;
$P_T$ is the power signal in Watts transmitted by the light source, namely a laser in LiDAR systems;
$\rho$ is the backscatter reflectivity of the target;
R is the range distance from the target to the receiving sensor
$A_{telescope}$=the area of the receiving sensor
$\alpha$=the attenuation factor, or extinction coefficient for the atmosphere and/or transmitting optical medium at hand.

As illustrated, a LiDAR transmitter, such as a laser 300, transmits a light beam of defined wavelength through an optical assembly 350 configured as a beam shaping apparatus that directs a LiDAR beam 360 onto a target scene in physical space. The target scene at hand, particularly for land-based imaging such as vehicle cameras and self-driving vehicles, typically includes target objects 380, such as buildings, vehicles, trees and other vegetation, or even people and animals. Most target objects subject to the optical path of the LiDAR light beam have solid shapes that are relatively uniform in consistency (i.e., the target objects of the prior art embodiment do not have an abundance of edges separated by open space). The nature of the target objects as entities with generally consistent or uniform surface areas means that a laser output beam 360 for LiDAR imaging has broader surface areas to reflect from each target object. Greater surface areas for reflection of an incident light beam enhances the potential to realize light of higher intensity at the receiver, or sensor. In one embodiment of the optical set-up from prior art LiDAR systems, the receiver uses reflected light to activate a single optical detector (i.e., photodiode, such as silicon or InGaAs pixels) in a sensor detector array and by spatially scanning the projected lidar beam to form a point cloud image of the target scene. The target objects are distinguishable within the point cloud image, in part because the target surface area is great enough to provide sufficient power in light received at the sensor but also because the surface area of most target objects is greater than the projection diameter of the transmitted light beam size, as shown in FIG. 3. With the target object surface area completely encompassing the laser beam size incident thereon, the system has much greater efficiency in reflecting light back to the sensor.

Figure 4A:
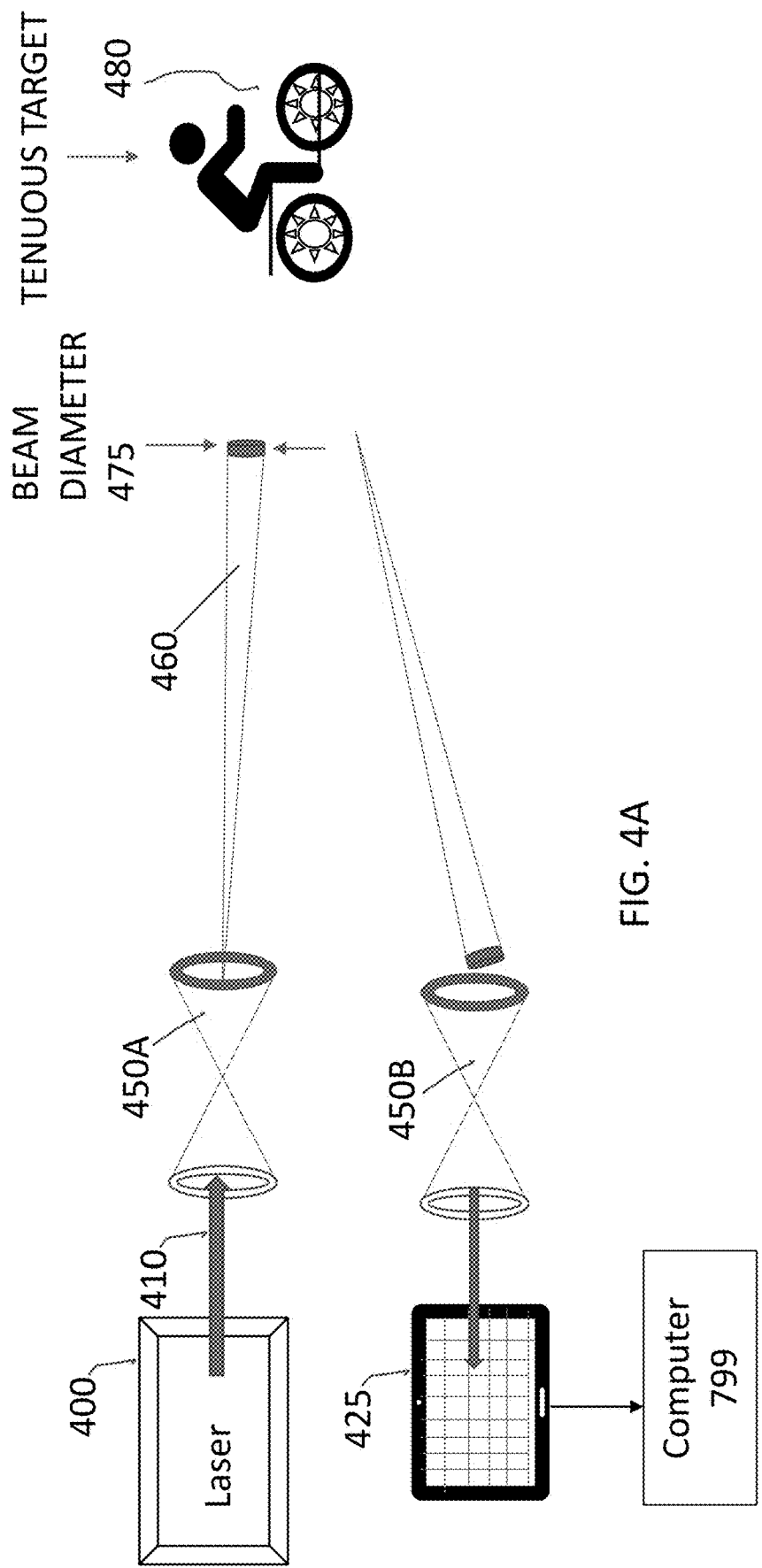
FIG. 4A is a schematic representation of an example implementation of this disclosure to focus the light source on a spatially tenuous object within a region of interest.

One issue addressed in the embodiments described herein, however, is that of detecting spatially tenuous target objects 480, as shown in FIG. 4A. For purposes herein, and without limiting the invention to any one embodiment, a spatially tenuous target object is one in which the surface area is discontinuous such that the spatially tenuous target object is made up of directly and indirectly connected but small pieces (i.e., considering the target object in the spatial domain, across numerous planes, cross sections, and axes, shows a plurality of edges, disconnects, heights, widths, and portions having respectively different densities and surface areas for reflecting). In other words, a spatially tenuous target object may include, but is not limited to, target objects 480 in which the composite pieces are separated by open space. In this regard, a LiDAR beam incident onto the spatially tenuous target object has multiple, but small and possibly separated, surface area regions to reflect light (e.g., a bicycle is an example of a spatially tenuous target object). In one embodiment, addressing this problem includes adjusting laser output so that the beam diameter incident onto a target scene has an adjusted beam diameter and enhanced directional focus to include a spatially tenuous object into a point cloud image and/or increase the received LiDAR signal intensity.

FIG. 4A illustrates one non-limiting embodiment of a LiDAR system that accounts for spatially tenuous target objects. The system as described below uses computerized algorithms to adjust, dynamically, the beam size of a LiDAR laser transmitter 400 output beam 410, either directly at the laser or with optical apparatuses 450 such as mirrors and lenses that adjust the output beam 460 with a certain size directed to a target physical scene. The result is an adjustment to the above noted LiDAR equation to the following corrected LiDAR equation:

$$P_R = P_T((\rho(A_T/A_B)(e^{-2\alpha R}/\pi R^2) \cdot A_{Telescope}), \text{ where:}$$

$A_T/A_B$ is the ratio of the physical or effective back-reflecting target area ($A_T$) and that of the transmitted LiDAR beam area $A_B$ at the target region.

In correcting a LiDAR set up to account for spatially tenuous target objects, the system uses a computerized controller in conjunction with the laser and the image processing software from the LiDAR and/or other sensor systems (such as video cameras, Doppler moving sensors, etc.) to make adjustments to the LiDAR beam transmitted as output toward the target scene. For example and without limiting the disclosure, the computer may utilize a feedback operation shown in FIG. 5 within an overall control system to detect a potential target object in a field of view 520 of a light source 500, and the target object may be partially obscured in a first image because of its spatially tenuous construction. In one non-limiting method, a light source 500, such as the above described laser, is used to establish a field of view 520 that encompasses a physical scene within the field of view 525. The system of FIG. 5, therefore, will reflect light from both uniform and tenuous target objects at 540, and the reflected light activates sensors that receive the reflected light accordingly at 545. As discussed below, the sensors may be described as the above noted telescope, optical detector, array of detectors. Upon identifying at least a portion of the spatially tenuous target object, algorithms programmed into image processing software at 550 are configured to iteratively and continuously use feedback from arriving point cloud images to adjust the beam diameter as illustrated in FIG. 4A. The beam diameter, therefore, is customized for each object, for different portions of the object, and at different moments of time, so that the most informative and data rich images are captured by the sensor from the back-scattered reflections of lidar data.

Adjusting the beam diameter 475 may include dynamic and variable focusing lenses or mirrors used to collimate a LiDAR transmitted beam; mirrors and lenses may be positioned for varying the area of the incident beam incident on the target; single or multiple laser beams with different spatial sizes and/or laser spatial TEM modes with different intensity distributions within the beam ($A_T$) may be transmitted in sequence or controlled dynamically. Any of these adjustments may be realized by a computerized dynamic change or dithering of the LiDAR light source (e.g., a laser) or the optical assemblies used to shape the beam. In one embodiment, the dithering is an iterative adjustment process, but the dithering can occur on an ad hoc basis, during a limited time period, or continuously during use of the LiDAR equipment. One goal, therefore, is to use adjustable output light beams from the light source that can pick up and reflect from diverse surfaces in spatially tenuous objects. A dithering operation is intended to have its broadest meaning in adjusting the size of an output light transmission toward a target object. The dithering may include adjusting a light output from a laser source by its beam diameter, applying multiple beam diameters in sequences toward the target object, and changing associated fields of view for the system with an adjustable light beam diameter. The dithering can be patterned, random, or iteratively focus-oriented on a particular region of a target. In this way, a system according to this disclosure can adjust data gathering resolution at the sensor for the object at hand, and in particular, to focus in on a portion of a target object. In many situations, a target object may be a moving target object; therefore, adaptive focusing operations of this disclosure enable tracking a portion of a target object or systematically finding an updated portion to provide additional back-scatter reflected data at an image sensor.

Figure 5:
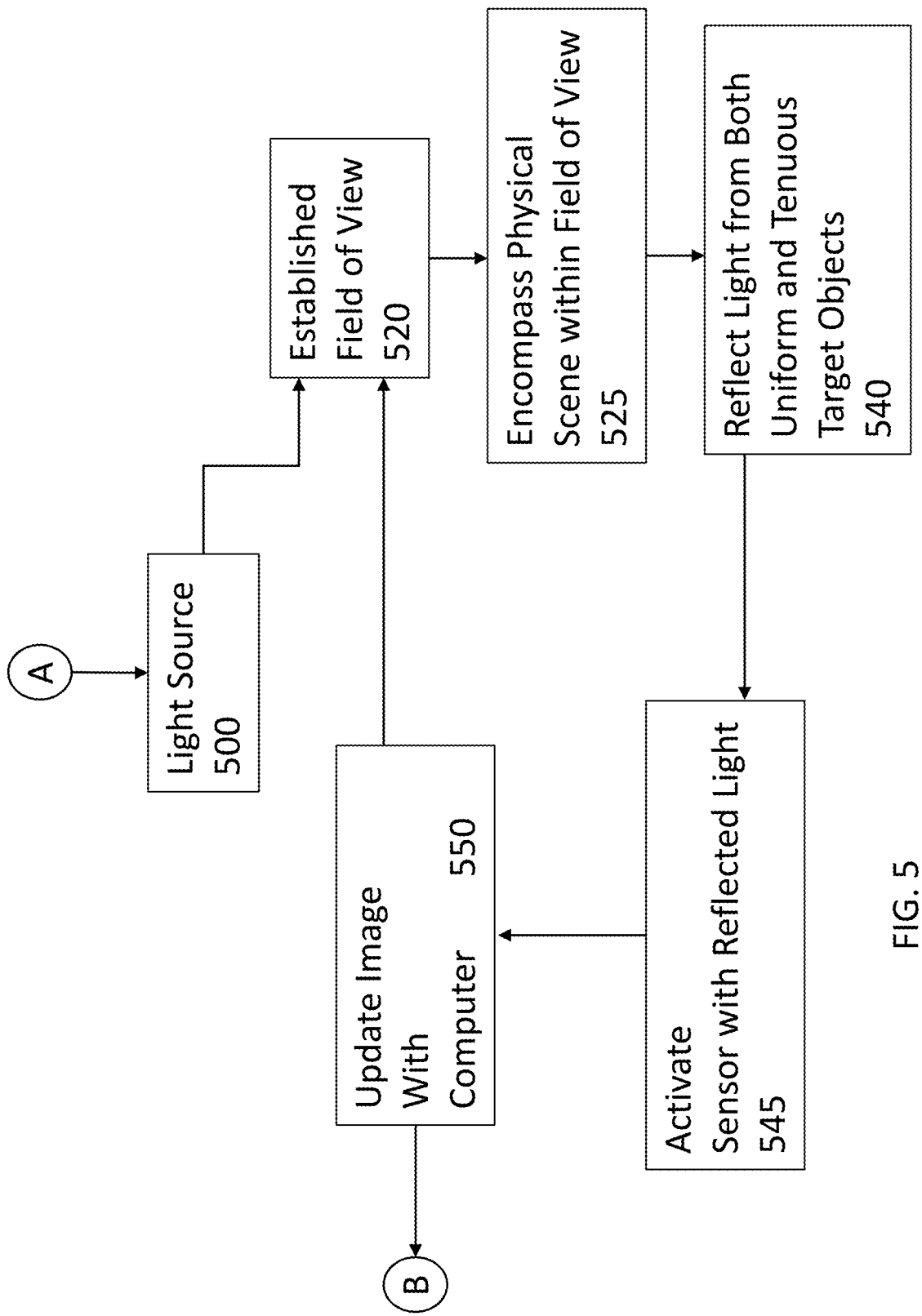
FIG. 5 is a schematic representation of the steps implemented by a computer implementing dynamic adjustment of a light source as disclosed herein.
Figure 6:
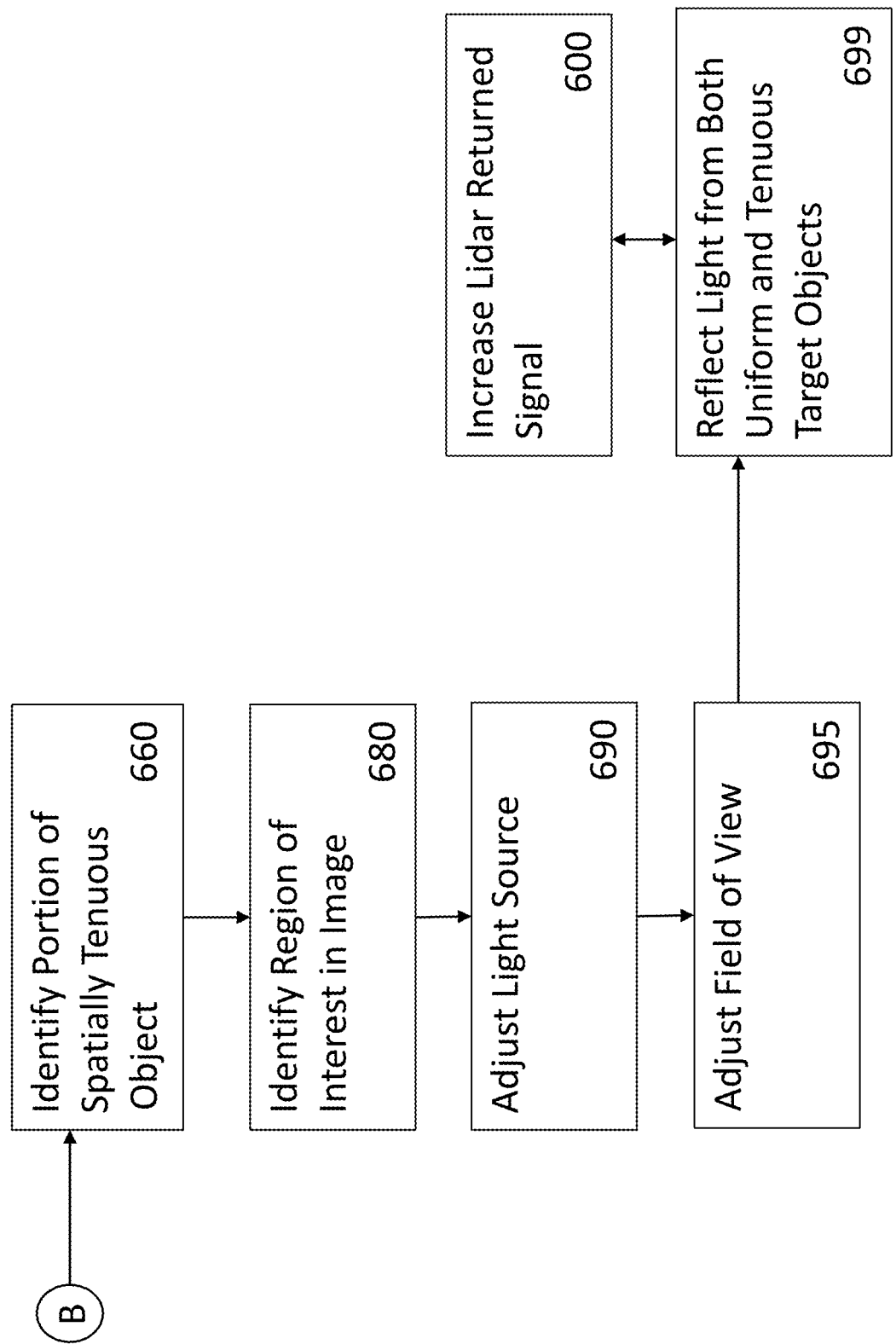
FIG. 6 is a schematic representation of the steps implemented by a computer implementing dynamic adjustment of a light source onto a spatially tenuous object as disclosed herein.

FIG. 6 illustrates a continuation of FIG. 5 at "B" in which a receiving imaging device, upon which reflected light image data is directed, identifies at least a portion of the spatially tenuous object 480. This identified portion is tagged in memory in software as a region of interest in the image data received back and corresponding to the portion of the spatially tenuous object at step 660. The computerized operations of this embodiment adjust the light source at 690 to create an updated field of view 695 to enhance the power of reflected light image data arriving at the imaging device as shown at step 699, which will increase the overall Lidar return signal for processing so the system can start over and continuously operate at 600.

Adjustments to the transmitted beam may also be effected pursuant to an interlacing operation in which dual lasers direct respective laser output beams to an optical assembly that forms a single output across one optical path toward the target. The two laser output beams may be pulsed according to timing mechanisms and may have respective diameters, such that the single output directs an overall transmitted light signal that has a projected diameter modulated in the time domain.

In other embodiments, the detection of the received back-reflected lidar signal may be accomplished by an optical detector or an array of detectors arranged as an overall imaging device. In this embodiment, a fraction of laser light intercepted and back-scattered by the target and detected by a receiving telescope and/or optical detector and/or detector array is increased using dynamic focusing. The concepts of this disclosure are not limited to a single optical detector, but also applies to a lidar scanner system using an optical detector array or an imaging camera for detection of the backscattered lidar signal. Along those lines, the dithering or changing of the transmitted beam size may increase the signal of the received lidar signal if a single optical detector is utilized but may also increase the signal of surrounding pixels and/or optical detectors if an optical detector 1-D or 2-D array of pixels is used, as in a Flash Lidar embodiment or in a multi-beam lidar system. In certain non-limiting embodiments, the array may be configured as 8 or 16 separate 1-D array of laser beams simultaneously and uses a 1-D array of 8 or 16 optical detectors.

The description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Embodiments of this disclosure may include components that are arranged to interact with computerized processes to increase the power of reflected signals arriving from a target body back to an imaging device, such as a telescope or one of the above noted arrays of pixels that are part of a camera operation. In these embodiments, one potential use is for lidar technology to be implemented in a vehicle so that automated safety operations may ensue when a vehicle installed lidar system hones in on either a large consistent target object like another vehicle, or a spatially inconsistent target object such as a bicycle, motorcycle, scooter, or even a human body on roller blades and the like. In the automotive industry, a lidar system as set forth herein may be installed to aid in artificially intelligent vision systems that are connected to computerized safety systems such as braking and driver alarm notifier systems to ensure that a driver sees a spatially tenuous object in its path. To accomplish such, an imaging system for a vehicle may include a light source that generates transmitted light that defines a field of view encompassing target objects within the transmitted light. At least one sensor is positioned to receive reflected light from at least a portion of at least one of the target objects. A computer is connected to the light source and the sensor, wherein the computer comprises a processor and computerized memory running software stored in the memory, wherein the software is configured to use the processor to compile an image from a series of data outputs from the sensor; determine a region of interest within the image; and dynamically adjust the transmitted light source to change the field of view and/or the light intensity distribution within the beam of the light source. In one non-limiting embodiment, successive received images have a higher image resolution and/or return signal level for the region of interest. Accordingly, changing the field of view may be accomplished by changing a projection diameter of the transmitted light. Furthermore, changing the field of view may include using the processor to compute a physical area corresponding to the region of interest in the image and adjusting the projection diameter and/or light intensity distribution within the beam of the transmitted light to correspond to the physical area of the region of interest. Changes to the field of view and the projection diameter may be configured to maximize a ratio defined as the physical area of the region of interest within an image over a cross sectional area of incident light arriving within the physical area. Changing the field of view also includes changing the direction of the transmitted light. In some embodiments, changing the field of view may require adjusting certain optics to account for software driven correction factors applied to the field of view and the direction of the light source. As noted above, the light source may be a laser, and the laser may emit light having a wavelength between the visible to infrared, including current LiDAR wavelengths near 0.9 μm and 1.5 μm. FIG. 4B shows that the light source may include multiple laser beams 410A, 410B having a plurality of respective projection diameters, and computer is configured for performing a dithering procedure on a laser output. In an arrangement with multiple laser beams, changing the beam size/field of view of one light source may slightly change the direction of the corresponding laser beam, but this can be adjusted by optics to be the same for both field of view beams. As shown in FIG. 4B, the reflected back-scatter beams 462A, 462B may be received at a computerized imaging device 425, such as a sensor pixel array and used, along with associated optics, to proceed with dithering and dynamic adjustment procedures of FIGS. 5 and 6.

In another embodiment, an imaging system for a vehicle may be installed with a light source that generates transmitted light that passes across a transmission optical path and defines a field of view encompassing target objects within the transmitted light. At least one sensor is within a return optical path of reflected light from at least a portion of one of the target objects. An optical assembly may be positioned within the transmission optical path and configured for dynamically adjusting the transmitted light and the field of view in response to the reflected light received at the sensor. A computer is connected to the light source, the sensor, and the optical assembly, wherein the computer comprises a processor and computerized memory running software stored in the memory, wherein the software is configured to: use the processor to compile an image from a series of data outputs from the sensor; determine a region of interest within the image; and dynamically adjust the transmitted light source to change the field of view and/or the light intensity distribution within the beam of the light source such that successive received images have a higher image resolution and/or return signal level for the region of interest.

In an imaging system of another embodiment, the optical assembly includes focusing lenses that collimate the transmitted light to a defined field of view that corresponds to a physical area represented by the region of interest in the image. The optical assembly includes mirrors and focusing lenses that define the field of view to correspond to a physical area represented by the region of interest in the image. The region of interest, therefore, can be adjusted to account for physical discontinuities and differences of a spatially tenuous target object. Changing the field of view includes using the processor to compute a physical area corresponding to the region of interest in the image and adjusting a projection diameter of the transmitted light to correspond to the physical area of the region of interest. In other words, the system uses artificial intelligence to understand the shapes and features of a target object, even a spatially discontinuous one, and find regions of that target object that provide the best reflected image data for analysis. Changes to the field of view and the projection diameter maximize a ratio defined as the physical area of the region of interest represented in the image over a cross sectional area of incident light arriving within the physical area. Changing the field of view further comprises changing the direction of the transmitted light. The imaging system may have two or more lasers with different projection diameters that are temporally interlaced in sequence and optically combined into the same transmitted direction.

A method of adjusting a field of view in an imaging system can be accomplished in a system for generating transmitted light with a light source such that the transmitted light passes across a transmission optical path and defines a field of view encompassing target objects within the transmitted light. The method includes positioning at least one sensor within a return optical path of reflected light from at least a portion of one of the target objects. A computer is connected to the light source and the sensor, wherein the computer comprises a processor and computerized memory running software stored in the memory, wherein the software is configured to:
use the processor to compile an image from a series of data outputs from the sensor; determine a region of interest within the image; and
dynamically adjust the transmitted light source to change the field of view and/or the light intensity distribution within the beam of the light source such that successive received images have a higher image resolution and/or return signal level for the region of interest Determining the region of interest includes identifying a target object that is smaller than the physical area of light incident on the physical region corresponding to the region of interest in the image. The method then includes dynamically adjusting the light source such that a projection diameter of the transmitted light incident on the target object maximizes a ratio defined as the physical area of the portion of one of the target objects over a cross sectional area of incident light arriving at the portion of the target object. The method of this disclosure allows for identifying a spatially tenuous target object that presents multiple edges separated by empty space within the region of interest Terminology Unless defined otherwise, all technical and scientific terms used herein have the same meaning as commonly understood to one of ordinary skill in the art to which this invention belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cited.

For spatial polarization profiles, such as vector modes of communication described herein, information may be modeled as being carried by the relative phase between two orthogonally-polarized components. The phase difference is spatially varying and can span multiple dimensions. Taking advantage of the phase difference for information transmission involves encoding the information with vector vortex modes and then decoding the information by applying polarization-dependent, spatially varying phase masks before interferometric detection.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Figure 7:
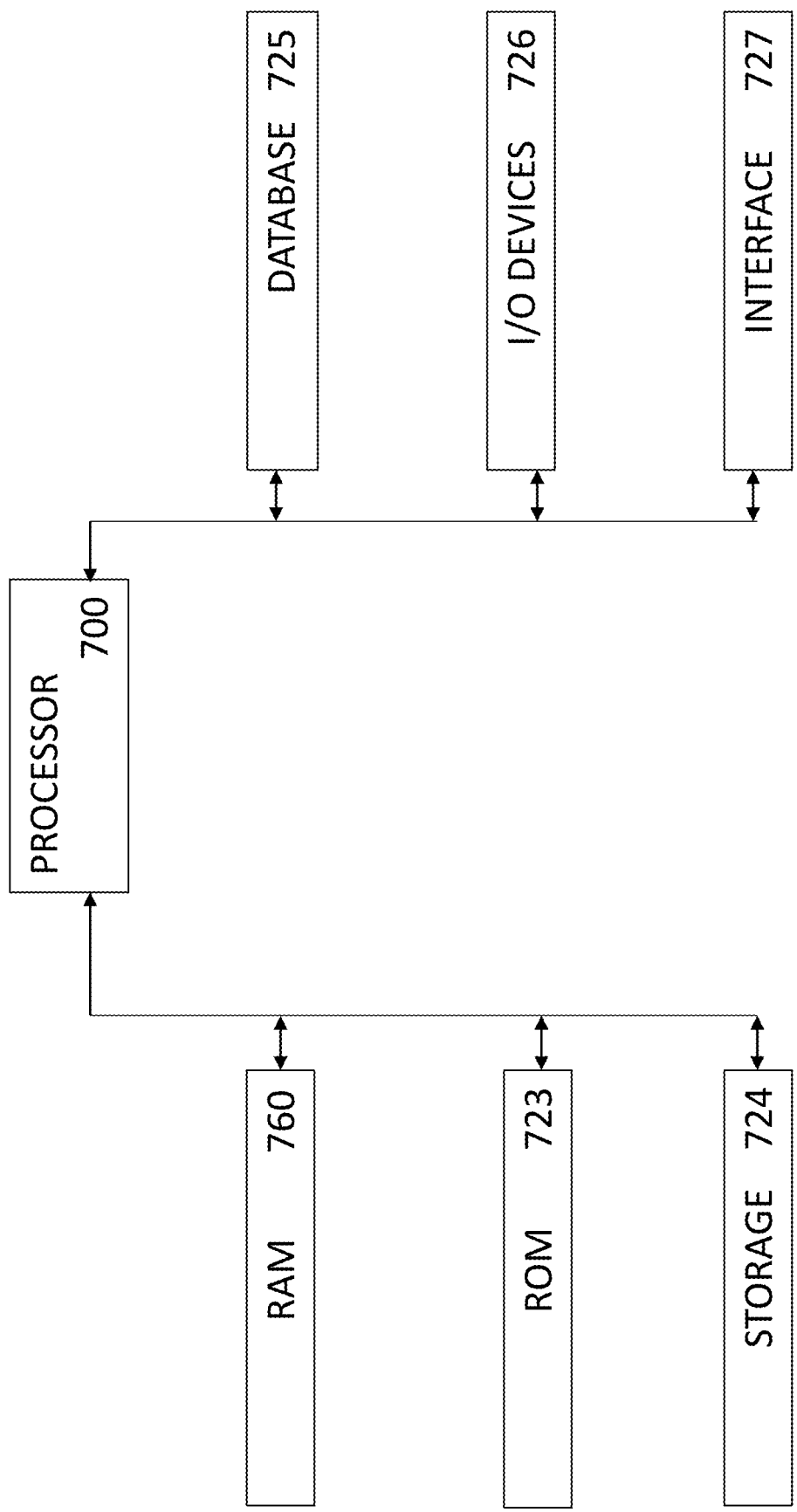
FIG. 7 is a schematic representation of an example computer processing environment used to implement the embodiments of this disclosure.

Any combination of one or more computer readable medium(s) may be used to implement the systems and methods described hereinabove. FIG. 7 illustrates an example computer environment in which a computer readable medium may be a computer readable signal medium or a computer readable storage medium in communication with a processor 700. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium 724 would include the following: an electrical connection having one or more wires, a portable computer diskette, a hard disk, a random access memory (RAM) 760, a read-only memory (ROM) 723, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Computer components may communicate with internal and external storage devices, such as databases 72 or other systems stored in a cloud computing environment and accessible with appropriate input/output (I/O) devices 726 and interfaces 727.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

The invention claimed is:

1. An imaging system for a vehicle, comprising:
a light source that generates transmitted light that defines a field of view encompassing target objects within the transmitted light;
at least one sensor positioned to receive reflected light from at least a portion of at least one of the target objects;
a computer connected to the light source and the sensor, wherein the computer comprises a processor and computerized memory running software stored in the memory, wherein the software is configured to:
use the processor to compile an image from a series of data outputs from the sensor;
determine a region of interest within the image; and
dynamically adjust the transmitted light source to change the field of view or the light intensity distribution within the beam of the light source such that successive received images have a higher image resolution and/or return signal level for the region of interest.

2. An imaging system according to claim 1, wherein changing the field of view comprises changing a projection diameter of the transmitted light.

3. An imaging system according to claim 2, wherein changing the field of view comprises using the processor to compute a physical area corresponding to the region of interest in the image and adjusting the projection diameter and/or light intensity distribution within the beam of the transmitted light to correspond to the physical area of the region of interest.

4. An imaging system according to claim 3, wherein changes to the field of view and the projection diameter maximize a ratio defined as the physical area of the region of interest within the image over a cross sectional area of incident light arriving within the physical area.

5. An imaging system according to claim 1, wherein changing the field of view further comprises changing the direction of the transmitted light.

6. An imaging system according to claim 5, wherein the light source comprises multiple laser beams having a plurality of respective projection diameters.

7. An imaging system according to claim 6, wherein the computer is configured for performing a dithering procedure on a laser output.

8. An imaging system for a vehicle, comprising:
a light source that generates transmitted light that passes across a transmission optical path and defines a field of view encompassing target objects within the transmitted light;
at least one sensor within a return optical path of reflected light from at least a portion of one of the target objects;
an optical assembly positioned within the transmission optical path and configured for dynamically adjusting the transmitted light and the field of view in response to the reflected light received at the sensor;
a computer connected to the light source, the sensor, and the optical assembly, wherein the computer comprises a processor and computerized memory running software stored in the memory, wherein the software is configured to:
use the processor to compile an image from a series of data outputs from the sensor;
determine a region of interest within the image; and
dynamically adjust the transmitted light source to change the field of view or the light intensity distribution within the beam of the light source such that successive received images have a higher image resolution and/or return signal level for the region of interest.

9. An imaging system according to claim 8, wherein the optical assembly comprises focusing lenses that collimate the transmitted light to a defined field of view that corresponds to a physical area represented by the region of interest in the image.

10. An imaging system according to claim 9, wherein the optical assembly comprises mirrors and focusing lenses that define the field of view to correspond to a physical area represented by the region of interest in the image.

11. An imaging system according to claim 8, wherein the sensor is an optical energy detector comprising an array of pixels configured to provide response data to a computerized imaging system by receiving back-reflected lidar signals thereon.

12. An imaging system according to claim 11, wherein the array of pixels is a one dimensional array or a multi-dimensional array.

13. An imaging system according to claim 12, wherein a fraction of back-reflected lidar signals of image data are detected using a dithering operation and dynamic focusing.

14. An imaging system according to claim 13, wherein changing the field of view comprises using the processor to compute a physical area corresponding to the region of interest in the image and adjusting a projection diameter of the transmitted light to correspond to the physical area of the region of interest.

15. An imaging system according to claim 14, wherein changing the field of view further comprises changing the direction of the transmitted light.

16. An imaging system according to claim 15, wherein the light source comprises multiple laser beams having a plurality of respective projection diameters.

17. An imaging system according to claim 16, wherein the light source comprises of two or more lasers with different projection diameters that are temporally interlaced in sequence and optically combined into the same transmitted direction.

18. A method of adjusting a field of view in an imaging system, comprising:
generating transmitted light with a light source such that the transmitted light passes across a transmission optical path and defines a field of view encompassing target objects within the transmitted light;

positioning at least one sensor within a return optical path of reflected light from at least a portion of one of the target objects;

using a computer connected to the light source and the sensor, wherein the computer comprises a processor and computerized memory running software stored in the memory, wherein the software is configured to:

use the processor to compile an image from a series of data outputs from the sensor;

determine a region of interest within the image; and dynamically adjust the transmitted light source to change the field of view or the light intensity distribution within the beam of the light source such that successive received images have a higher image resolution and/or return signal level for the region of interest.

19. The method according to claim 18, wherein determining the region of interest comprises identifying a target object that is smaller than the physical area of light incident on the physical region corresponding to the region of interest in the image.

20. The method according to claim 19, wherein dynamically adjusting the light source such that a projection diameter of the transmitted light incident on the target object maximizes a ratio defined as the physical area of the portion of one of the target objects over a cross sectional area of incident light arriving at the portion of the target object.

* * * * *